United States Patent [19]

DeJuneas et al.

[11] 4,013,622
[45] Mar. 22, 1977

[54] METHOD OF REDUCING BREAKDOWN IN POLYETHYLENE FILM

[75] Inventors: James V. DeJuneas, Hamilton Township; Gordon L. McIntyre, Trenton; James F. O'Horo, Jr., Hightstown, all of N.J.

[73] Assignee: Cities Service Company, Tulsa, Okla.

[22] Filed: June 23, 1975

[21] Appl. No.: 589,498

[52] U.S. Cl. ............... 260/45.95 S; 260/33.4 PQ; 264/211; 526/1
[51] Int. Cl.² ............... B29D 7/02; C08L 23/06
[58] Field of Search ............ 260/33.4 PQ, 94.9 GD; 264/210 R, 211; 526/1

[56] References Cited

UNITED STATES PATENTS

| | | | |
|---|---|---|---|
| 2,879,244 | 3/1959 | Coler | 260/33.4 PQ |
| 3,361,702 | 1/1968 | Wartman et al. | 260/33.4 PQ |
| 3,387,073 | 6/1968 | Larsen | 264/211 |
| 3,455,863 | 7/1969 | Williams | 264/211 |
| 3,492,310 | 1/1970 | Carrow | 264/211 |
| 3,580,735 | 5/1971 | Shimodoi et al. | 264/211 |

*Primary Examiner*—Allan Lieberman
*Attorney, Agent, or Firm*—George L. Rushton

[57] ABSTRACT

The addition of 200–500 ppm of polyethylene glycol (mw 1,300–7,500) to polyethylene film reduces the incidence of breakdown at typical operating conditions.

4 Claims, No Drawings

METHOD OF REDUCING BREAKDOWN IN POLYETHYLENE FILM

BACKGROUND OF THE INVENTION

This invention concerns a method of reducing imperfections in blown plastic film. More particularly, it concerns a method of reducing "breakdown" in blown polyethylene film.

Blown film is typically formed from low-density polyethylene. In the blown film process, polyethylene pellets are melted and extruded from an annular die to form the film envelope. In the extruder and die system, there are typically "dead spots" or "hangup areas" where the molten polyethylene does not move rapidly, resulting in long heat histories for portions of the melt. It is theorized that the polyethylene in these areas tends to be decomposed or cross-linked, forming particles that are of a distinctly different viscosity from the rest of the molten polymer. As portions of the polymer are flushed from these hangup areas, they cause imperfections in the film, known as "stripes", "memory lines", "arrowheads" or "chevrons", and gels, collectively known as "breakdown", which often disrupts production in the form of "breakoff" or "tearoff". These imperfections cause a lowering of the quality of the blown film and are economically undesirable. It is recognized in the blown film industry that blown film dies that operate at low pressures usually experience more "breakdown" than do high pressure dies. Since the resin producer does not known in what machines his resin will be used, it is prudent to furnish a resin having a reduced tendency for "breakdown". The incidence of "breakdown" is typically (or can also be) reduced by lowering the extruder output and thus the melt temperature of the polymer, reducing the tendency toward decomposition of the polymer. Therefore, any device or method for decreasing "breakdown" without decreasing output is a desirable advance in the art.

SUMMARY OF THE INVENTION

We believe we have advanced the art of blown film production, by reducing "breakdown", through the addition of small amounts of polyethylene glycol to the polyethylene. It is well-known in the blown film industry that various additives are combined in the low-density polyethylene resin for various purposes, such as diatomaceous earth for anti-blocking and fatty acid amides for slip agents. And polyethylene glycol has been used as an anti-static agent in molding operations. But as far as we know, there are no compositions or processes that use polyethylene glycol of the molecular weight and in the amounts that we use for our invention.

To minimize the incidence of "breakdown" in blown film during the processing of low-density polyethylene, we propose:

A. A composition comprising
1. a majority of low-density polyethylene resin, and
2. a minor amount of a polyethylene glycol.

And

B. A method comprising incorporating a minor amount of polyethylene glycol into a low-density polyethylene resin prior to extrusion.

DESCRIPTION OF PREFERRED EMBODIMENTS

The polyethylene discussed in this invention concerns what is commonly called "low-density" polyethylene. This means a density of from about 0.915 to about 0.929 g/ml. Included in this "low-density" classification are copolymers of PE with ethylene vinyl acetate (EVA), with mixtures up to about 5% EVA being considered as low-density polyethylene. The great majority of such polyethylene is used in producing blown film, typically used for trash bags, packaging materials, construction and building films, and agricultural mulch. One characteristic of such blown film is its thickness, of from about 0.3 to about 10 mils (0.0762–0.254 mm), so the appearance of defects, such as gels, holes, and die lines in the film lowers the quality of the film. "Breakdown", the excessive formation and appearance of gels, is somewhat machine-dependent, based on the design and operating characteristics of the extruder and die system, but it is believed that temperature, internal die geometry and flow patterns within the die are the major parameters involved. There is no standard "breakdown" test, so experiments involving the appearance and disappearance of "breakdown" are subjective.

Other additives used in polyethylene resins include antioxidants, such as butylated hydroxytoluene, slip, such as fatty acid amides, anti-block, such as finely divided silica, etc. These additives are well known in the resin industry and need not be discussed further here.

Typical extrusion temperatures are in the 300–450° F. range, while other operating conditions are dependent on the product being extruded.

There are many materials that are called polyethylene glycols. These can range from low molecular weight, oily liquids to high molecular weight, waxy solids, and they are well-known articles of commerce. Broadly, most of these polyethylene glycols can be used to reduce "breakdown," but certain practical limits rule out those materials at each extreme of the molecular weight range, since the low molecular weight oily liquids are more difficult to blend into the resin prior to its use in blown film operations, while the high molecular weight solids don't give desirable results. Thus, polyethylene glycols, in the molecular weight range of from about 600 to about 20,000, preferably from about 1300 to about 7500, are better adapted for use in minimizing "breakdown" in polyethylene resins. In the plastics trade, polyethylene glycols are typically segregated by "grades", with a numerical grade indicating a nominal molecular weight but having a range of weight within this grade. Thus, a grade 6000 has a molecular weight range from about 6000 to about 7500, while a grade 1540 has a range of about 1300–1600. In the examples used later, the grade number will be noted. These polyglycols are incorporated into polyethylene resins by various methods, such as preparing a masterbatch and then "letting-down" by dry blending with additional resin, prior to use in the extruder.

The concentration at which the polyglycols are used in polyethylene broadly varies from about 100 ppm to about 600 ppm, based on the mixture fed to the extruder. The preferred concentration ranges from about 200 to about 500 ppm. Concentrations above 600 ppm can be used but are economically wasteful. As noted above, different converters will employ different parameters in producing film, and thus a range of polyglycol levels is needed.

EXAMPLE 1

A film grade polyethylene resin containing no additives was extruded into film, and the melt temperature was increased by 10° F.(5.55° C.)/hour until "breakdown" occurred, as noted by the presence of arrowheads in the film. The effect of adding polyethylene glycol was determined by introducing a polyethylene glycol concentrate (1% polyethylene glycol of grade 4000 based on the total weight of polyethylene resin concentrate) into the film grade resin so as to give various concentrations of polyethylene glycol, in ppm, in the film grade resin mixture fed to the extruder. The "breakdown" temperature and time elapsed before "breakdown" was observed were then noted.

| PEG (ppm) | "Breakdown" temp. | | Time to "Breakdown" |
|---|---|---|---|
| | (° F.) | (° C.) | (hrs)* |
| 0 | 330 | (165) | 1–1.5 (heavy breakdown) |
| 100 | 340 | (171) | 2 (light breakdown) |
| 200 | 350 | (177) | 2 (very light breakdown) |
| 300 | up to 450 | (up to 232) | no breakdown up to 6 hrs. |

*extruder was purged clear, set at "breakdown" temperature, sample was introduced, and time to "breakdown" was observed.

EXAMPLE 2

Five (5) different resins, each containing antioxidant slip, and anti-block additives at levels employed commercially, were used in a series of experiments. Resin A was run until "breakdown" was noted. Then, additional resin, now containing 200 ppm of polyethylene glycol (grade 6000), was fed to the extruder. Within 1.5–2 hours of the addition of the PE-PEG mixture, the "breakdown" condition was cleared. Further, when additional resin containing no PEG was fed to the extruder, "breakdown" returned.

This experiment was repeated with Resins B, C, D, and E, each following the above procedure. Details are given below:

| Resin | Type | Density (g/cm³) | T(° F) | (° C) | Time to Breakdown | Time to Clear Breakdown |
|---|---|---|---|---|---|---|
| A | Homopolymer Liner | .920 | 400 | (204) | 20 min. | 2 hrs. |
| B | Homopolymer Clarity | .922 | 430 | (221) | 10 min. | 1.5 hrs. |
| C | Homopolymer Clarity | .923 | 410 | (210) | 5 min. | 2 hrs. |
| D | Homopolymer Liner | .917 | 390 | (199) | 20 min. | 1.5 hrs. |
| E | Copolymer Clarity | .926 | 390 | (199) | 60 min. | 1.5 hrs. |

And, in each case, "breakdown" returned when the original resin without PEG was fed to the extruder.

EXAMPLE 3

Samples of polyethylene resins A and B, as described in Ex. 2, were prepared, each containing 200 ppm polyethylene glycol of grade 4000, in addition to the other typical additives.

Resin A, plus polyethylene glycol, was run at increasing temperatures up to 450° F. (232° C.), which is far above the usual "breakdown" temperature, while Resin B, plus polyethylene glycol, was run up to 460° F.(238° C.). For each resin, no "breakdown" was observed after 1 hour at these temperatures. It is to be noted that one hour at the elevated temperatures is appreciably longer than the time for "breakdown" in Ex. 2.

EXAMPLE 4

Since polyethylene glycol has a known use as an antistatic agent, used at levels of 1–3 wt.%, the antistatic effect at 200 ppm level was checked. Samples of polyethylene containing 0 ppm, 100 ppm and 200 ppm polyethylene glycol of grade 4,000 were made, and the resultant film was extruded. Pieces of film were cut from each sample roll, and these pieces were rubbed against a wool sweater, to produce a static charge on the polyethylene. The charged pieces of film picked up essentially equal amounts of dust, noted by visual observation, showing that 200 ppm of polyethylene glycol is below the effective antistatic level.

Additional "breakdown" experiments, as in Ex. 2 and using polyethylene glycols in concentrations of 300, 400, 500, and 600 ppm, with grades varying from 1,000 to 20,000 (such as 1000, 4000 and 20,000), give results similar to those of Ex. 2.

We claim:

1. A composition, to reduce breakdown in polyethylene blown film, comprising
   a. a majority amount of low-density polyethylene of about 99 wt.%, depending on the levels of antiblock, slip, and anti-oxidant additives, based on the weight of the finished composition, and
   b. a minor amount of polyethylene glycol, varying from about 100 to about 600 ppm, based on the weight of the finished composition, and wherein the molecular weight of the polyethylene glycol varies from about 600 to about 20,000.

2. The composition of claim 1, in which
   a. the density of polyethylene varies between about 0.915 and about 0.929,
   b. the amount of polyethylene glycol varies from about 200 to about 500 ppm, and
   c. the molecular weight of polyethylene glycol varies from about 1300 to about 7500.

3. A method for reducing breakdown in low-density polyethylene, used in blown film applications, which comprises
   a. incorporating a minor amount of polyethylene glycol in the low-density polyethylene prior to extrusion, in which the added amount of polyethylene glycol varies from about 100 to about 600 ppm, based on the weight of the total composition, and the molecular weight of the added polyethylene glycol varies from about 600 to about 20,000.

4. The method of claim 3 wherein the amount of polyethylene glycol varies from about 200 to about 500 ppm, and the molecular weight varies from about 1,300 to about 7,500.

* * * * *